United States Patent [19]

Hitchcock et al.

[11] 3,800,272

[45] Mar. 26, 1974

[54] ROTATING ACOUSTIC SCANNER SYSTEM FOR POSITIONING OBJECTS ON THE OCEAN FLOOR

[75] Inventors: Robert D. Hitchcock, Ventura; Richard J. Malloy, Ojai, both of Calif.

[73] Assignee: The United States of America as represented by the Secretary of the Navy, Washington, D.C.

[22] Filed: Aug. 8, 1972

[21] Appl. No.: 279,134

[52] U.S. Cl................................... 340/3 R, 340/3 T
[51] Int. Cl............................................... G01s 9/68
[58] Field of Search............ 340/3 R, 3 T, 4 A, 4 R, 340/5 R, 8 S, 8 FT; 102/13

[56] References Cited

UNITED STATES PATENTS 2,418,846   4/1947   Meacham............................. 340/3 R

*Primary Examiner*—Richard A. Farley
*Attorney, Agent, or Firm*—Richard S. Sciascia; Joseph M. St. Amand

[57] ABSTRACT

A pair of rotating sonar transducers are mounted on a support structure which is equipped with thruster units for effecting vertical and lateral motion of the system during deployment on the ocean floor. Position accuracy is obtained by deployment of a self-contained benchmark array which is used to establish a reference plot.

4 Claims, 6 Drawing Figures

PATENTED MAR 26 1974  3,800,272
SHEET 1 OF 2

ROTATING ACOUSTIC SCANNER SYSTEM FOR POSITIONING OBJECTS ON THE OCEAN FLOOR

BACKGROUND OF THE INVENTION

1. Field of the Invention

This invention relates generally to a system for accurately positioning objects on the ocean floor and more particularly to a system wherein sonar reflectors are deployed within an ocean bottom area to establish a reference plot used in subsequent emplacement operations of objects positioned relative to the sonar reflectors.

2. Description of the Prior Art

In certain oceanographic and ocean engineering experiments or projects it becomes necessary to implant a benchmark or series of benchmarks on the seafloor to serve as reference points in subsequent implantment operations in which two or more objects must be accurately positioned on the seafloor relative to each other, or in which one or more objects must be accurately positioned relative to certain natural bottom features. For example, in establishing a certain type of seafloor sonar array, it would be necessary to implant a large number of hydrophones in precisely determined relative positions so as to generate the required sonar beam geometry and, because of the need for high sensitivity and high directivity, the array would have to be spread over an area having dimensions on the order of 200 feet on a side, in which case it would not be practicable to emplace a single structure containing all the hydrophones, particularly if each hydrophone were self-powered by a nuclear device weighing around two tons. Another example is the implantment of a two-piece structure consisting of (1) a foundation, and (2) a superstructure to be positioned onto the foundation in a separate emplacement operation. Beyond a certain depth, it would be necessary to position the superstructure entirely by constraints generated from the surface vessel rather than, say, guidelines installed at the time of the foundation emplacement. In both these examples some types of sonar system would be required to establish precise relative positions since undersea optical positioning is limited to ranges usually under 30 feet.

State-of-the-art techniques for accurate seafloor positioning operations utilize either acoustic transponders or 360° echo-ranging sonar. While both short baseline and long base-line transponder systems provide high precision in determining position, both types of system require self-powered subsurface units containing complex electronic circuitry. Echo-ranging sonar systems utilize a relatively small scanning transducer attached to the end of a pipe or cable handled from the surface. Because of the small size of the scanning head, the azimuth beam spread is usually not less than about 3° at ranges on the order of 100 feet. Furthermore, such systems are equipped with a single scanning transducer and hence can only determine transducer-to-target range without being able to measure elevation and lateral distance of target relative to transducer.

In the accurate relative positioning of a large number of objects, say, hydrophones, over a seafloor area on the order of 200 feet on a side, a long baseline transponder system would have the disadvantage of requiring complex self-powered subsurface units as well as a surveying-in-operation. A short baseline system would require a large array of hydrophones to be handled from the surface. The echo-ranging sonar system would have the disadvantage of not being able to provide accurate positioning in azimuth at large range, and in a situation where the bottom targets were stationed at different elevations (i.e., sloping or irregular bottom), the echo-ranging system could not determine elevation and lateral range of targets with sufficient precision for proper emplacement of the separate units of the sonar array.

In summary, state-of-the-art acoustic systems provide the most accurate measurement on the relative positions of two or more bottom or near bottom objects by the use of transponders which have the disadvantages of electronic complexity and self-contained power supplies. Hence, there is a need for a system utilizing the echo-ranging principles which will provide relative position accuracy comparable to that of a transponder system. The invention described herein is basically a 360° echo-ranging system but with the capability of (1) measuring lateral distance and elevation of target, and (2) deploying its own passive benchmark array for establishment of a reference position plan indicator (PPI) plot.

SUMMARY OF THE INVENTION

The present invention is a system for accurately placing an object on the ocean floor and includes a pair of rotating side-scan sonar transducers mounted one above the other on a support structure which is equipped with thruster units for effecting vertical and lateral motion of the scanner during deployment so that sonar reflectors can be dropped to the seafloor in a circular array.

STATEMENT OF THE OBJECTS OF THE INVENTION

Thus, an object of the present invention is to provide a novel system for accurately placing an object on the ocean floor.

Another object of the present invention is to provide a thruster device which is capable of moving the system to different lateral positions.

Another object of the invention is to provide acoustic data which can be used on board an ocean-going vessel to precisely position an object on the seafloor.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
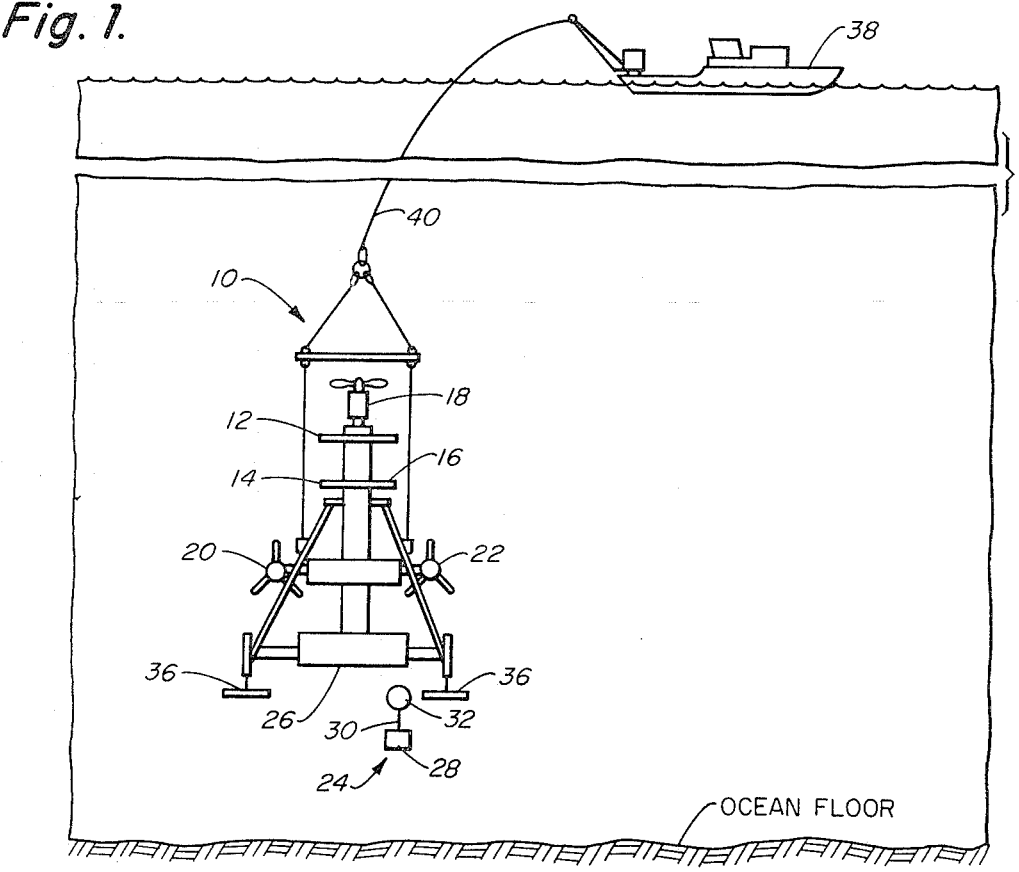
FIG. 1 is a schematic view of the present rotating acoustic scanner system illustrating the system being deployed.

Referring to the embodiment shown in the drawing, there is indicated generally a rotating acoustic scanner system 10 comprising a pair of rotating side-scan sonar transducers 12 and 14 mounted one above the other and positioned on a supporting structure 16. A vertical thruster 18 is mounted on the top portion of structure 16 and lateral thrusters 20 and 22 are mounted on each side thereof to generate vertical and lateral motion of the system 10 prior to touchdown on the seafloor. It will be noted that feet 36 are attached to the bottom of the supporting structure 16 to permit a smooth touchdown.

The thruster mechanism is a very important feature of the rotating acoustic scanner system 10. It enables the system to be moved to different positions from which sonar reflectors 24 can be dropped to the seafloor to form a roughly circular array of targets 26 with a radius of about 200 feet. The large radial scatter of the sonar targets 24 is necessary because of the requirement for accurate positioning over a relatively large area.

The thruster mechanism is designed to move the rotating acoustic scanner system 10 laterally in any direction or vertically in either direction while the surface vessel 38 to which it is attached by cable 40 is restricting its own lateral excursion. Each thruster is equivalent to 1,000 pounds thrust and are of the propeller variety cable of satisfactorily positioning loads up to 100 tons in water.

Figure 4:
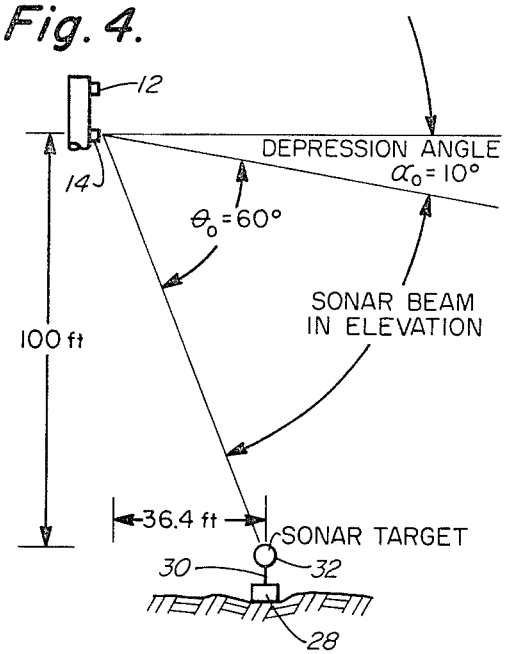
FIG. 4 is an elevational view of the transducers also illustrating the manner in which scanning operations are employed.

The sonar targets or reflectors 24 for the rotating acoustic scanner system would be deployed by first dropping one target to the seafloor from a height of about 100 feet above bottom and then moving rotating acoustic scanner system laterally until the target appeared on the shipboard plan position indicator. Since the side-scan transducers have a wide angle in elevation, the rotating acoustic scanner system would have to be lowered very little, if any, below the drop-point height to register the first target. As shown in FIG. 4, a lateral movement of about 36 feet would bring the target into view if the depression angle alpha ($\alpha$) of the sonar transducer were about 10° and the elevation beam width angle theta ($\theta_o$) were around 60°. The rotating acoustic scanner system would then be moved further, laterally, until a suitable offset from the first target was reached, about 200 feet, and a second target dropped. Offset would be determined, if required, by using one scanning transducer in conjunction with a fathometer, not shown, which could be attached to the rotating acoustic scanner system. The third target would be dropped 200 feet from the second target in such a position as to form roughly the arc of a 200-foot radius circle which would contain six targets spaced 200 feet apart. Again, a single scanning transducer and the fathometer would be sufficient to determine the third drop point. The remaining three drop pooints would be determined by echo-ranging on the corresponding pair of preceding drop points.

Figure 2:
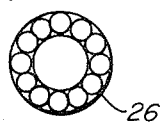
FIG. 2 is a plan view of the carrousel device used to deploy the targets.
Figure 3:
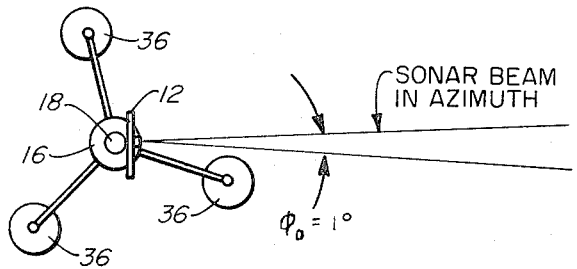
FIG. 3 is a plan view illustrating the manner in which scanning operations are employed after deployment of the targets.

The method of dropping sonar targets or reflectors is shown in FIGS. 1 and 2. A carrousel device 26 is attached to the bottom of the rotating acoustic scanner system support structure with its axis coincident with the axis of the rotating acoustic scanner system so that each target would be dropped from a point off axis from the rotating acoustic scanner system. Details of the release mechanism and target rigging are all within the state-of-the-art and need not be described in this disclosure. The target 24 consists basically of an anchor 28 connected by a short wire 30 to a polyvinyl chloride glass float 32. The diameter of the spherical float should be about 16 inches to insure good detectability by the scanning transducers.

Figure 5:
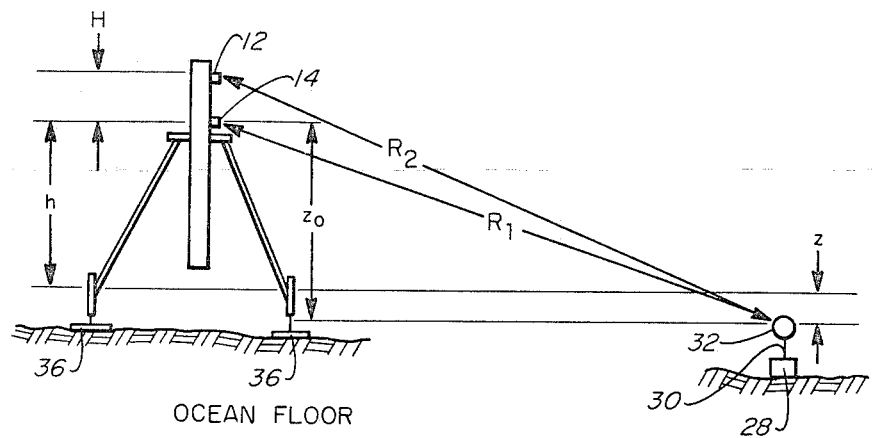
FIGS. 5 and 6 illustrate the geometry for determining the XYZ position of sonar targets.
Figure 6:
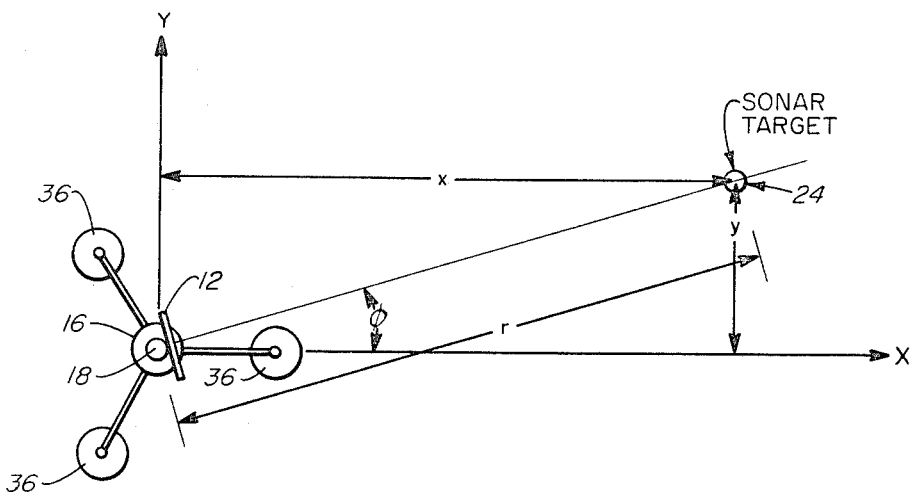

In the establishment of the reference plan position indicator, the rotating acoustic scanner system is placed on the seafloor as close as possible to the centroid of the target array. Both scanning transducers 12 and 14 are then used to determine the XYZ position of each target 24 relative to an arbitrarily chosen set of axes with origin on the axis of the rotating acoustic scanner system. As shown in FIGS. 5 and 6, the XYZ position of each sonar target can be determined by measuring the echo ranges, $R_1$ and $R_2$, in the usual way utilizing the following equations:

$$x = r \cos \Phi \quad (1)$$

$$y = r \sin \Phi \quad (2)$$

$$r = [R_1^2 - z^2]^{1/2} \quad (3)$$

$$z_o = [(R_2^2 - R_1^2)/2H - (H/2)] \quad (4)$$

$$z = h - z_o \quad (5)$$

$\Phi$ = azimuth angle between $r$ and $x$-axis
$H$ = height separation of transducers
$h$ = height of lower transducer above reference point on rotating acoustic scanner system axis A record of the plan position indicator display could be made by means of a photographic camera, but actually the matching process carried out during the positioning of seafloor objects would be done by computer. The record of the reference plan position indicator plot would be projected onto a screen simultaneously with the display obtained during the positioning operation. Adjacent to the screen would be a second display of the errors in XYZ for each target. These numbers would be read on an incandecent numerical display. Positioning would be completed when the minimum value of the error was displayed. Lateral positioning would be done manually by controlling the rotational speed of the thrusters being used to move the load. These could be the same set of 1,000 pound thrusters 18, 20 and 22 used in the establishment of the reference plan position indicator plot or a different set of thrusters, depending on the load size and weight.

The principal advantage of the rotating acoustic scanner system is the fact that it does not depend on an active sea-floor device for measurement of position, such as is the case with the known transponder system. A transponder requires not only complex, reliable electronic circuitry, but also a self-contained power supply which will last long enough to carry out the positioning operations (which may occupy a period of a year or more).

The advantage of the rotating acoustic scanner system over state-of-the-art 360° scanners is the fact that the rotating acoustic scanner system can measure true lateral coordinates and elevations by having two side-scan transducers which determine distances by triangulation or possibly interferometry.

Obviously, many modifications and variations of the present invention are possible in the light of the above teachings. It is therefore to be understood that within the scope of the appended claims the invention may be practiced otherwise than as specifically described.

We claim:

1. A rotating acoustic scanner system for positioning objects on a deep water floor from a surface vessel comprising:

a supporting framework;

a pair of rotating sonar transducers mounted on said framework;

a series of thruster units each mounted on said framework and adapted to effect vertical and lateral motion to said rotating acoustic scanner system during the deployment operation;

means attached to the bottom of said framework for dropping sonar reflectors to the deep water floor in a specified pattern; and means for transmitting the information by said transducers in relation to said reflectors to the surface vessel where the required exact position is contemplated.

2. The rotating acoustic scanner system of claim 1 wherein:

said rotating sonar transducers are of the side-scan type and are mounted one above the other on said supporting framework.

3. The rotating acoustic scanner system of claim 2 wherein said series of thruster units include:

a vertical motion thruster mounted on the top portion of said supporting framework; and lateral motion thrusters mounted on each side of said framework, said thrusters being of the propeller type and capable of moving the system in any lateral and vertical direction.

4. The rotating acoustic scanner system of claim 3 wherein said means for dropping sonar reflectors include:

a carrousel device attached to the bottom of said supporting framework having openings therein in which a series of said reflectors are emplaced prior to being deployed on the aqueous floor.

* * * * *